(12) United States Patent
Li et al.

(10) Patent No.: US 8,103,605 B2
(45) Date of Patent: Jan. 24, 2012

(54) CUSTOMS INFORMATION SYSTEM WITH SELECTIVE TRANSACTION AUDIT

(75) Inventors: Mei Li, Gilbert, AZ (US); Theresa M. Ellis, High Point, NC (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3513 days.

(21) Appl. No.: 10/121,268

(22) Filed: Apr. 12, 2002

(65) Prior Publication Data

US 2003/0195815 A1  Oct. 16, 2003

(51) Int. Cl.
 *G06Q 30/00* (2006.01)
(52) U.S. Cl. ........................................... 706/26; 705/27
(58) Field of Classification Search ...................... 705/26
 See application file for complete search history.

(56) References Cited

U.S. PATENT DOCUMENTS

| | | | |
|---|---|---|---|
| 5,968,110 A | 10/1999 | Westrope et al. | |
| 6,219,653 B1 | 4/2001 | O'Neill et al. | |
| 6,460,020 B1 | 10/2002 | Pool et al. | |
| 2002/0095355 A1* | 7/2002 | Walker et al. | 705/26 |
| 2003/0163447 A1* | 8/2003 | Sandman | 707/1 |

OTHER PUBLICATIONS

U.S. Appl. No. 09/969,369, filed Oct. 1, 2001, Wells et al.
U.S. Appl. No. 09/969,342, filed Oct. 1, 2001, Delmer et al.
U.S. Appl. No. 09/969,368, filed Oct. 1, 2001, Le et al.
U.S. Appl. No. 09/971,878, filed Oct. 4, 2001, Le et al.
U.S. Appl. No. 10/115,723, filed Apr. 3, 2002, Li et al.

* cited by examiner

*Primary Examiner* — James Zurita (57) ABSTRACT

A system for generating and auditing customs documents for the importation of goods purchased by a buyer from a seller. The system includes a customs information system database that features records configured to record transaction information identifying the goods purchased, a customs classification of the purchased goods, and a valuation of the purchased goods. The system further includes an audit module configured periodically to audit the information in the records using a set of audit criteria. The audit module selectively audits only records containing transaction information that has been sent to a customs broker to be submitted to a customs authority.

3 Claims, 3 Drawing Sheets

CUSTOMS INFORMATION SYSTEM WITH SELECTIVE TRANSACTION AUDIT

The present invention relates generally to devices and methods of supporting import and export activity and, more particularly, to methods and computer systems configured for creating, auditing and correcting customs documentation.

BACKGROUND OF THE INVENTION

In support of an international purchase made by a buyer, a customs broker will typically provide customs documentation to a local customs authority upon the entry of purchased goods into the buyer's country. This customs documentation, which typically will be in either paper or electronic form, contains customs information. The customs information normally includes transaction information, such as the identity and location of the buyer and seller, and the type of goods being sold. The customs information also includes other information such as both a customs classification and a customs value for the imported, purchased goods. Traditionally, customs brokers generate a significant portion of the customs documentation using a commercial invoice that accompanies the goods, along with supplemental documents such as a shipping manifest. The seller of the goods generates the commercial invoice, which they include with shipping documents that accompany the purchased goods during transport.

The buyer is legally responsible for the content of the customs documents, including being responsible for noting special requirements such as increased, "antidumping duties" on certain goods, setting the appropriate classification of the goods, and determining the correct value of the goods. The commercial invoice sometimes lacks significant information for making these determinations. Additionally, the commercial invoice will not reflect individual buyer-corporation's policies regarding valuation and classification of goods. Procedures and apparatus are therefore needed to ensure customs documents are generated in conformance with both import/export laws and individual corporate policies. Additionally, procedures and apparatus are needed to identify errors in such documents, and the sources of these errors when they are repeated.

Presently, a customs broker and/or buyer can use customs database software to store customs information identifying goods that they purchase internationally, along with the identities of the buyer and the seller, and each of their countries. The software can also store classification and valuation information. A customs broker can access such customs database software and use that customs information in generating customs documentation.

Separately, customs documentation auditing software exists to audit transactions of a single buyer. To use this auditing software, after a customs brokerage completes the filing of customs documentation on products purchased by that buyer, the customs brokerage either manually enters the customs information from the customs documentation, or downloads it from separate in-house software operated by the customs brokerage. The auditing software takes the entered customs information and audits it against a predetermined set of criteria, including verifying it with a database of the buyer's preferred classifications. This preferred classification database might include antidumping information.

While this auditing software can be useful in catching errors, it is frequently time consuming, and it can be subject to both delays and data entry errors. Additionally, it only audits information on the final state of the customs documents, rather than tracking information sources and identifying sources of processing errors.

Accordingly, there has existed a need for procedures and apparatus to ensure customs documents are generated in conformance with both import/export laws and individual corporate policies. Additionally, there has existed a need for procedures and apparatus to identify and locate the sources of repeated filing errors and remedy the errors and/or their causes. Preferred embodiments of the present invention satisfy various combinations of these and other needs, and provide further related advantages.

SUMMARY OF THE INVENTION

In various embodiments, the present invention solves some or all of the needs mentioned above, providing methods and apparatus for generating and auditing customs documents for the importation of goods purchased by a buyer from a seller. The apparatus of the invention includes a system having a customs information system database. This database generally features records configured to record transaction information identifying the purchased goods, a customs classification of the purchased goods, and a valuation of the purchased goods. The apparatus further includes an audit module configured to audit the information in the records using a set of audit criteria.

The apparatus is configured to record that customs information has been sent to a customs broker for submission to a customs authority. Advantageously, these features allow the audit module periodically to run an audit of all records that have been sent to the customs broker for submission, without running an audit on records that might be only partially complete in the pre-submission state.

The apparatus further features an internet interface providing for both the buyer and the customs broker to access the system using a typical web browser. The system database is configured to be in electronic communication with the buyer such that the buyer can enter transaction, classification and valuation information in the first set of records and assist information in the second set of records. Likewise, the system database is configured to be in electronic communication with the customs broker such that the customs broker can access the first and second set of records to enter information and generate customs documents including the transaction information.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

DETAILED DESCRIPTION OF THE PREFERRED EMBODIMENTS

The invention summarized above and defined by the enumerated claims may be better understood by referring to the following detailed description, which should be read with the accompanying drawings. This detailed description of particular preferred embodiments of the invention, set out below to enable one to build and use particular implementations of the invention, is not intended to limit the enumerated claims, but rather, it is intended to provide particular examples of them.

Preferred embodiments of the present invention reside in systems of apparatus and related procedures to ensure customs documents are generated in conformance with both import/export laws and individual corporate policies. Additionally, preferred embodiments of the present invention reside in apparatus and related procedures both to locate filing errors, and to identify and locate the sources and causes of repeated filing errors, leading to the remediation of those causes.

The Transaction

Figure 1:
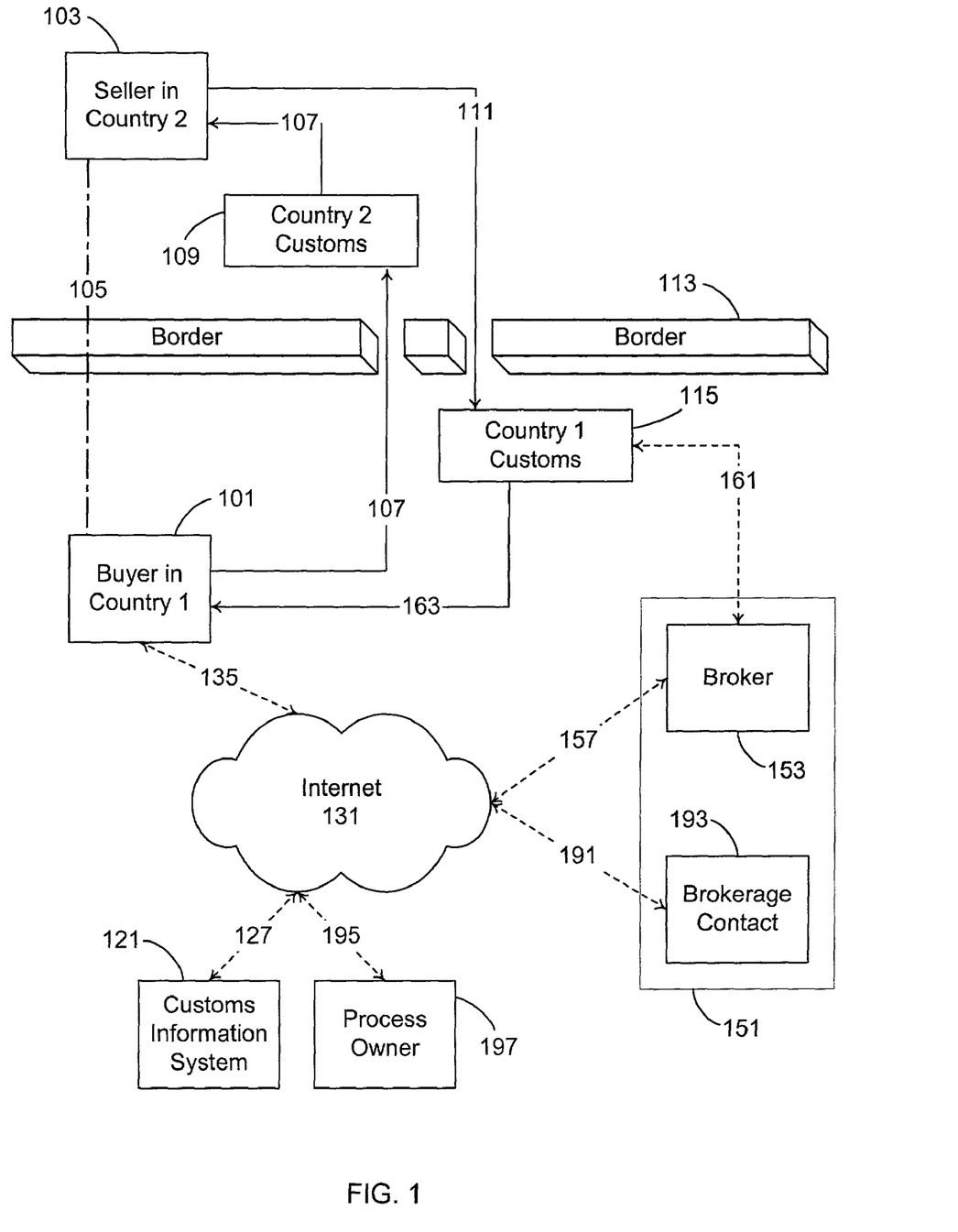
FIG. 1 is a schematic representation of the interactions between participants in an international purchase of goods under the present invention.

With reference to FIG. 1, in a first preferred embodiment of the invention, a buyer 101 in a first country agrees and contracts with a seller 103 in a second country to purchase goods. The buyer is preferably a company or a group within a company, but it could be an individual. In the resulting agreement 105, the buyer might further agree and contract to provide the seller with some form of assistance (hereinafter, an "assist") in the design, development, and/or manufacture of the goods. If so, then the seller in turn agrees and contracts to sell the goods to the buyer at a price below the market price at which the seller would sell the goods to the buyer without receiving the assist.

Per this transaction, agreed upon in the agreement 105, the buyer 101 provides the assist 107 to the seller 103, possibly being assessed duties by the customs authority 109 in the seller's country. The assist is in the form of goods and/or services supplied by the buyer directly and/or indirectly to the seller in connection with the buyers acquisition of the purchased goods. The buyer at either no cost or reduced cost provides the assist to the seller (or parties related to the seller). More information regarding the assist can be found in U.S. patent application Ser. No. 10/115,723, entitled CUSTOMS INFORMATION SYSTEM WITH ASSIST CALCULATION ENGINE, filed Apr. 3, 2002.

The seller then ships some or all of the purchased goods to the buyer, causing these shipped goods to be transported 111 across the first country's border 113 to the storage facilities of the first county's customs authority 115. The customs authority then holds the goods until customs documents are filed and approved.

Customs System Operation

Figure 2:
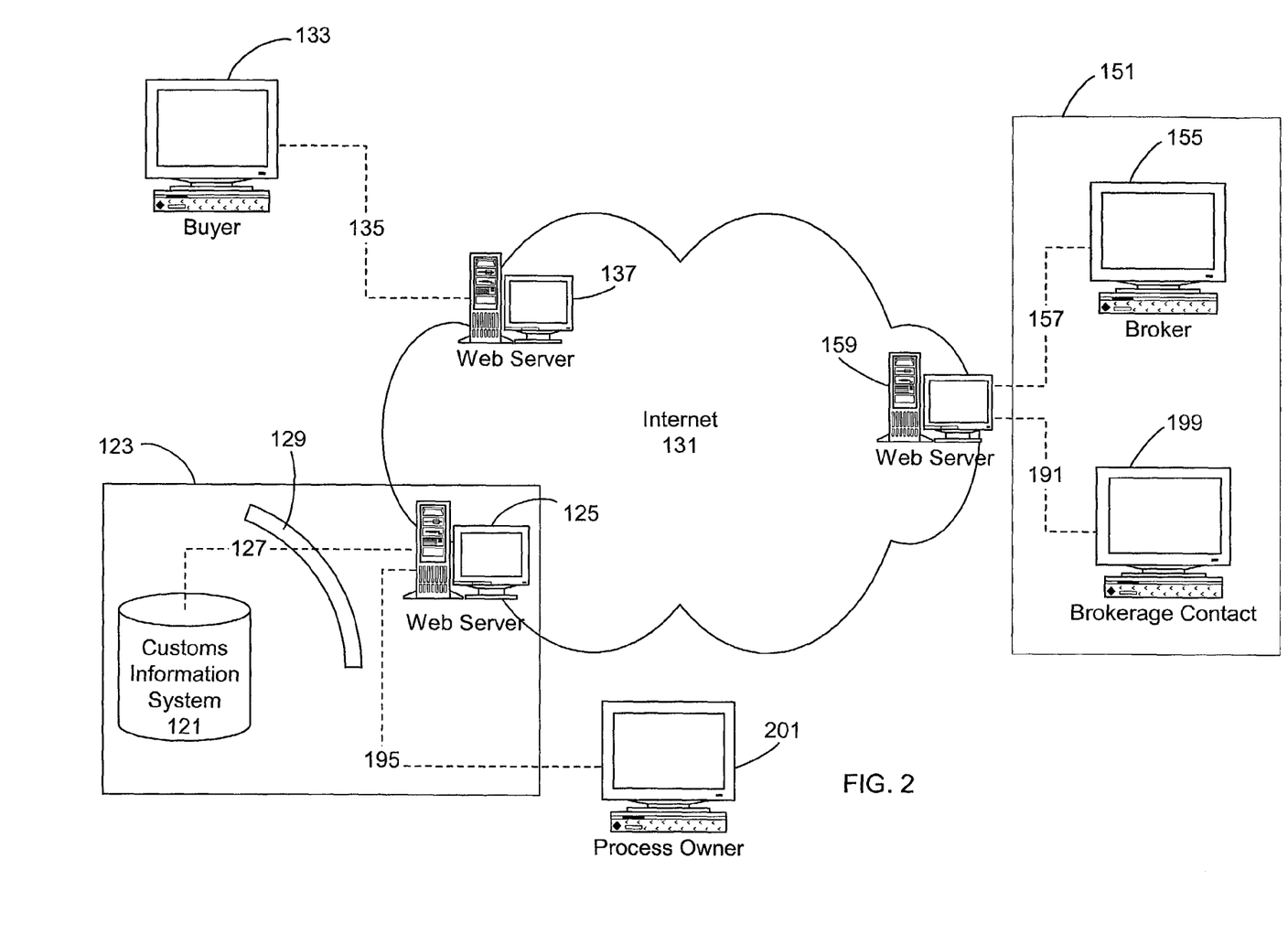
FIG. 2 is a diagram of a communication system architecture that supports the use of a customs information system embodying the present invention.

With reference to FIGS. 1 and 2, after the agreement 105 is reached, personnel of the buyer might directly interact with records of a database within a customs information system 121 to enter some or all of the customs information. Furthermore, personnel of the buyer might indirectly enter some customs information into the customs information system by entering transaction information, valuation information and/or assist information, into purchasing software that is configured to provide information to the customs information system. For example, the buyer might enter assist information directly into the customs information system, while entering transaction information indirectly into the customs information system via purchasing software.

Preferably, the customs information system 121 is part of larger computer system 123 including a web server 125 that places the customs information system in communication with the internet. The customs information system communicates with 127 (i.e., transmits communications to and receives communications from) its related web server 125 through a firewall 129, so as to communicate with other computer systems via the internet 131.

Personnel of the buyer 101 preferably use a computer 133 running an internet browser to transmit and receive communications 135 containing the customs information via the internet to the customs information system 121. The buyer's computer 133 will typically connect to the internet 131 via a second web server 137. Alternatively, the buyer's computer might be networked directly to the customs information system or its web server.

When purchased goods are received by the customs authority 115 of the buyer's country, a customs brokerage 151 engaged by the buyer 101 is notified and receives a copy of a commercial invoice, along with other supplemental documents sent with the shipped goods, such as a manifest. A customs broker 153 of the customs brokerage accesses the appropriate customs information in the customs information system 121. In particular, the customs broker uses a computer 155 running an internet browser to transmit and receive 157 communications, via the internet 131, from the customs information system 121. The computer 155 will typically connect to the internet via a third web server 159.

The customs broker's transmitted and received 157 communications contain customs information. In particular, using software modules related to the customs information system 121, the customs broker can preferably review the customs information in the customs information system for the transaction shown on the commercial invoice. This accessed information might include all information relevant to valuation, such as cost and assist information. For partial shipments of the purchased goods, and for goods for which the buyer did not enter any or all of the customs information, the customs broker preferably can modify the records of the customs information system database to reflect the customs information for the shipment.

Furthermore, if the customs broker believes that existing customs information is defective (i.e., incomplete or wrong), the customs broker preferably can add, edit and/or delete customs information from the record or records relating to the transaction shown on the commercial invoice. Alternatively, the customs broker also has the power to call the buyer's attention to any defect, allowing the buyer to correct the defect. Preferably, the customs information system 121 tracks all changes, either by separately tracking the changes or by leaving the original records unchanged and adding modification records.

When the customs broker 153 is satisfied that the customs information is both complete and correct for the shipped goods, the customs broker then instructs the customs information system 121 to send the complete set of customs information for the shipment to the customs broker for submission to the customs authority 115. At approximately the same time that the software modules send the complete set of customs information, the software modules also flag the record or records for the transaction to indicate that the information has been sent for submission. The customs broker then uses the sent customs information to prepare the final customs documents.

Preferably, the customs broker's preparation of the final customs documentation only entails the addition of various required information, such as broker identification information and/or duty payment information (e.g., the source of funds to be used for duty payment), to the customs information. Finally, the customs broker submits 161 the customs information as customs documents to the customs authority 115. The submission can take various forms, such as a paper submission or an electronic submission. Presuming the customs authority is satisfied with the submitted customs documents, the shipped goods are released and allowed to be transported 163 to the buyer and/or a party designated by the buyer.

Configuration of the Customs System

Figure 3:
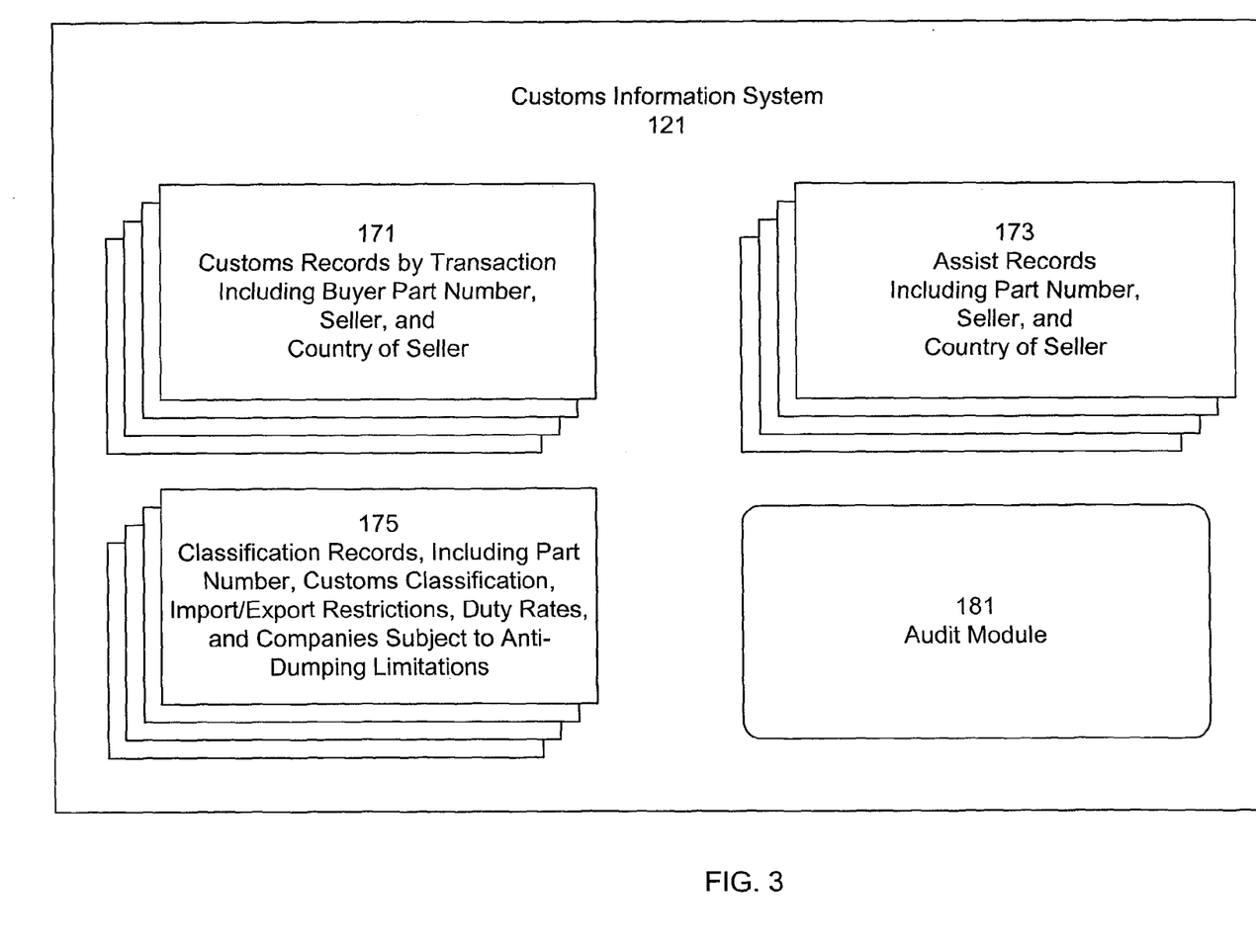
FIG. 3 is a diagram of record types and modules contained within the customs information system depicted in FIG. 2.

With reference to FIGS. 1-3, the firewall 129 of the computer system 123 typically screens all communications to the customs information system 121. This is also preferably true in alternative network architectures, such as where the buyer and/or the customs broker connect to the customs system via an intranet rather than the internet 131.

To provide the services described above, the database of the customs information system 121 preferably includes a first set of records 171 configured to represent different transactions, each transaction being all or part of an agreement such as the agreement 105 between the buyer 101 and the seller 103. Records in the first set of records preferably include a part number. More preferably, the part number is a buyer part number that uniquely identifies the type of part being purchased with respect to all other parts that the buyer purchases. Preferably, the records in the first set of records further include customs classification information.

Records in the first set of records also preferably include a record of the identity of the buyer and the seller, as well as the identity of each of their countries. Furthermore, such records also preferably include an entry type, which reflects whether the goods are brought in under a claim of a special status, such as being subject to antidumping duties. Also, these records preferably include a special program indicator, for indicating that a product is qualified for reduced duties under a special trade program such as NAFTA. All this information is generally used in determining the duties required to be paid and/or the legality of the transaction.

Records in the first set of records also preferably include a sent-flag configured to indicate whether the customs information system has sent the customs information to a customs broker for final submission to a customs authority. For agreements represented by more than one record, the sent-flag can optionally be configured to indicate a group of records sent together. Preferably, the records include a field for tracking the date that the customs information was sent to the customs broker for final submission to a customs authority.

The customs information system 121 preferably also includes a second set of records 173 representing different assists provided for the manufacture of parts of a given part number related to a given transaction, each transaction being all or part of an agreement such as the agreement 105 between the buyer 101 and the seller 103. More preferably, records in the second set of records include a part number corresponding to part numbers in the first set of records, and a record of the identity of the buyer and the seller and/or their respective countries. Preferably, but not necessarily, records in the second set of records all relate and/or be keyed to transactions recorded in records of the first set of records, to aid in providing the appropriate assist information to the customs broker with the transaction information.

The customs information system 121 preferably also includes a third set of records 175 representing the buyers chosen classifications for all of the goods it imports. These classification records include a part number, a customs classification, any known import/export restrictions, the appropriate duty rates, and a list of any companies subject to antidumping limitations. Preferably, the third set of records includes a part number corresponding to part numbers in the first and second sets of records.

In some embodiments of the invention, less information (e.g., fewer fields in each record) will be stored than is described above. For example, if a system is designed for use by a single buyer, then the buyer's identity and/or the buyer's country need not be stored in the records. In such a case, the records would lack a "buyer" or "buyer's country" field. Likewise, if a system is designed to be used with a separate database of sellers and their countries, then each record need only contain a single seller identification record that corresponds to the records in the database of sellers.

Preferably, the sets of records are configured to track changes that are made to the records. Therefore, the customs information system can provide an audit trail to review the process by which the customs information was gathered and entered.

It should be understood that the above sets of records can be, but need not be stored on a single machine. They can be linked within a single database, or they can be separate databases, preferably using common definitions for part numbers, country designations, and the like. For example, the classification records 175 might preferably be on an entirely separate computer system maintained by a group whose focus is on the changing rules of the appropriate customs authorities, while the customs records 171 and the assist records 173 might be on a computer system maintained by a group whose focus generally includes purchasing and/or logistics. Therefore, the customs information system should be understood as a broad concept that can apply to various system architectures.

Audit Functionality

To provide for audit functionality, the customs information system 121 is configured with an audit module 181. The audit module preferably performs complete audits of the customs information automatically on a periodic basis, such as once a day. Alternative embodiments of the module could perform audits on the occurrence of certain events (such as large transactions) or when instructed to perform an audit by someone having an interest in the system (such as buyer personnel). Alternative embodiments of the module could also perform audits limited in scope, such as limited to a single transaction, limited to a single buyer's transactions or limited to some other limited set of transactions.

In performing a complete audit, the audit module 181 preferably calls and reviews each record of the customs records 171 for which the sent-flag indicates that the customs information system 121 has sent the customs information to the customs broker 153 for final submission to the customs authority 115. In particular, the audit module checks and verifies the customs information of each record using a particular set of criteria, which may be specific to each buyer 101. If a criterion is not met, (i.e., if the verification indicates that either a further review should be conducted or a correction needs to be made), then an action is taken. Each criterion of the set of criteria has an associated action to be taken when that criterion is not met.

Among the types of actions that can be used are sending communications, such as email, to various parties. Transmitting a communication 191 to a brokerage contact person 193 is one such action. Transmitting a communication 195 to a process owner 197 (i.e., a person either having responsibility for the processes undertaken by the customs information system 121, or having responsibility for the auditing process) is another such action. Typically, the brokerage contact person will have a computer 199 networked with the other computers at the customs brokerage 151, communicating with the internet 131 through the same web server 159 as the customs broker 153. The process owner will normally have a computer 201, which can connect to the customs information system 121 via an intranet, or indirectly connect to the customs information system through either the customs information system web server 125 or another web server.

The audit module 181 can be coded with the particular criteria (and related actions) to be used, or it can maintain a database of criteria and actions. In verifying the customs information, the audit module, might access the classification records 175, the assist records 173, or any other source of relevant information. A number of different types of verifications are described below, and it should be understood that the inclusion of other verification types is envisioned within the scope of the invention.

A first criterion of the preferred embodiment is a classification criterion. Under this criterion, the customs record classifications must agree with the classifications listed in the classification records. In particular, in the audit, the parts number contained in each record of the customs records 171 is used to query the classification records for a correct classification number as of the date that the customs information was sent to the customs broker for submission to the customs authority. Then the queried classification number is compared with the classification number listed in the customs record.

Included among the reasons particular records might fail this criterion are that various parties, and particularly customs brokers, could ignore or override the classification information provided by the classification records. Also, it is possible that the computer system containing the classification records was not available to be accessed by the customs broker when entering customs information.

The preferred action associated with the classification criterion is to send a message to the brokerage contact 193, indicating that the entered classification does not match the records 175 of the classification database, and instructing the brokerage contact to resolve the difference with personnel of the buyer 101 and/or personnel associated with the customs information system 121. A copy of this message is preferably sent to the process owner 197, allowing the process owner both to track completion of the instructed actions and to monitor and report on the frequency of this type of criterion failure for the particular customs broker 153 and/or customs brokerage 151. In resolving the classification of the imported parts, the buyer (or the customs brokerage) might end up filing additional customs documents correcting any prior error and paying additional duties or requesting a refund of excess duties.

A second criterion of the preferred embodiment is an antidumping criterion. Under this criterion, if the goods are subject to antidumping duties, the customs records must indicate that the entry type acknowledged the products to be subject to antidumping laws. In particular, in the audit, unless the entry type indicates that the products were acknowledged to be subject to antidumping laws, the part number and country of origin listed in the customs records 171 are compared with a list of products and countries subject to antidumping duties as of the date that the customs information was sent to the customs broker for submission to the customs authority. This list can be contained in a separate database, or it can be incorporated into the classification records 175.

Included among the reasons particular records might fail this criterion are that various parties, and particularly customs brokers, could incorrectly enter this information. Also, since dumping determinations are based on the manufacturer rather than the country of origin, it is possible that records failing to meet this criterion are correct (i.e., the records do not claim the products to be subject to antidumping laws because the products' manufacturers have not been held to be dumping goods below cost).

The buyer is required to declare the goods as subject to antidumping laws. Therefore, the preferred action associated with the antidumping criterion is to send a message to the brokerage contact 193, indicating that there might be an antidumping issue, and that the manufacturer should be checked to be sure that the antidumping laws do not apply. A copy of this message is preferably sent to the process owner 197, allowing the process owner both to track completion of the instructed actions and to monitor and report on the frequency of actual antidumping errors discovered for the particular customs broker 153 and/or customs brokerage 151. In resolving the antidumping issues, the buyer (or the customs brokerage) might end up filing additional customs documents correcting any prior error and paying additional duties.

A third criterion of the preferred embodiment is a special classification criterion. In this context, "special classification" is used to refer to product classifications provided for products in special circumstances. For example, special classifications would include product classifications for returned goods, temporary imports, or imports after repair. Under this criterion, if the customs records indicate a particular special classification, the buyer's preferences for using that classification could be checked. For example, a buyer might prefer always to have a manual review of the classification when a special classification is used. Alternatively, the buyer might choose never to use one or more special classifications. Therefore, in the audit, if the classification in a record of the customs records 171 indicates a special classification, then that classification is checked against the buyers preferences.

The preferred action associated with the special classification criterion will depend on the buyer's preferences for using that classification. If the buyer's preference is not to use that special classification, then a message is sent to the brokerage contact 193, indicating that the buyer's policy is not to claim that special classification. Alternatively, if the buyer's preference is always to have a manual review of the classification when a special classification is used, then a message could be sent to the customs broker to contact the buyer and verify that the special classification is appropriate. A copy of either of these messages is preferably sent to the process owner 197, allowing the process owner both to track completion of the instructed actions and to monitor and report on the frequency special classification errors discovered for the particular customs broker 153 and/or customs brokerage 151. In resolving the special classification issues, the buyer (or the customs brokerage) might end up filing additional customs documents correcting any prior error and paying additional duties.

A fourth criterion of the preferred embodiment is a high-duty criterion. Under this criterion, if the total duty for the transaction, or for a particular product in a transaction, is greater than a predetermined review-level amount, then the classification and/or valuation (including currency conversions) should be confirmed. In particular, in the audit, if either the total duty paid is higher than a total duty review-level, or the duty paid for a single product type is higher than a line-item review-level, then the classification and valuation are to be confirmed. In a variation of this embodiment, a high-valuation review-level could be used in place of a high-duty review level.

The preferred action associated with the high-duty criterion is to send a message to the brokerage contact 193, instructing the brokerage contact to forward a copy of the entire customs filing package (in either paper or electronic form) to the process owner. A copy of this message is preferably sent to the process owner 197, along with instructions to verify the relevant classification and/or valuation information. This allows the process owner to verify the customs broker's work, and monitor and report on the frequency of corrections instituted on erroneous classifications or valuations. In resolving the high-duty issues, the buyer (or the customs brokerage) might end up filing additional customs documents correcting any prior error and paying additional duties or requesting the refund of duties.

A fifth criterion of the preferred embodiment is a special program criterion. Under this criterion, the use of trade programs can be confirmed against the buyer's preferences for using such programs, and qualification for such programs can be checked. In particular, in the audit, the special program indicator is checked for indicating use of a special trade program, such as Mexican goods under NAFTA, Canadian goods under NAFTA, or a claim of a general special program. If the use of a special program is indicated, then it is checked against a list of the special programs that the buyer is willing to claim. If the special program is one the buyer is willing to claim, and if the special program requires a certification to claim status under the special program (e.g., NAFTA), then a database of received certifications is checked.

Included among the reasons particular records might fail this criterion are that a customs broker could be unaware that the buyer chooses not to use a special program, or that a customs broker could be unaware that the buyer does not have proper certification for a particular product even though the product would qualify for such certification. Also, it is possible that the database containing the buyer's preferences and/or certificates, which might or might not be the database having the classification records, is not available to be accessed by the customs broker when entering customs information.

The preferred action associated with the special program criterion is to send a message to the brokerage contact 193, indicating that the special program claim should not be used. A copy of this message is preferably sent to the process owner 197, allowing the process owner both to track completion of the instructed action and to monitor and report on the frequency of this type of criterion failure for the particular customs broker 153 and/or customs brokerage 151. In resolving the classification of the imported parts, the buyer (or the customs brokerage) might end up filing additional customs documents correcting any prior error and paying additional duties.

A sixth criterion of the preferred embodiment is an assist criterion. Under this criterion, for a customs record indicating a given product from a given country, the assist records must not indicate an outstanding assist balance to be claimed for the given product from that given country. In particular, in the audit, the part number and seller's country contained in each record of the customs records 171 are used to query the assist records for an outstanding assist balance that is still to be claimed as of the date the customs record is sent to the customs broker for submission to the customs authority. Then the queried assist balance is reviewed for a non-zero value.

Included among the reasons particular records might fail this criterion are that various parties, and particularly customs brokers, could ignore or override the assist information. Such actions could be made for appropriate reasons, such as a buyer wanting assists to be claimed proportionally over a larger number of products, or a buyer providing different assists to different manufacturers (sellers) within a single country. Also, it is possible that the computer system containing the assist records is not available to be accessed by the customs broker when entering customs information.

The preferred action associated with the classification criterion is to send a message to the brokerage contact 193, indicating that the assist module needs to be checked and the claimed assist verified. A copy of this message is preferably sent to the process owner 197, allowing the process owner both to track completion of the instructed actions and to monitor and report on the frequency of this type of criterion failure for the particular customs broker 153 and/or customs brokerage 151. In resolving the classification of the imported parts, the buyer (or the customs brokerage) might end up filing additional customs documents correcting any prior error and paying additional duties.

A seventh criterion of the preferred embodiment is a random selection criterion. Under this criterion, a given percentage (e.g., 2%) of all entries are selected for a through review. The preferred action associated with the random selection criterion is to send a message to the brokerage contact 193, instructing the brokerage contact to forward a copy of the entire customs filing package (in either paper or electronic form) to the process owner. A copy of this message is preferably sent to the process owner 197, along with instructions to perform a complete review of the customs documents. This allows the process owner to verify the customs broker's work, and thereby to monitor and report on the frequency of corrections instituted on erroneous customs information. In resolving any issues discovered in the review, the buyer (or the customs brokerage) might end up filing additional customs documents correcting any prior error and paying additional duties or requesting the refund of duties.

Other possible actions related to various criteria might include: instructing the process owner 197 to conduct a review of the audit trail for any of the problems to determine the source of the problem; notifying the buyer that problems are occurring among its personnel and/or actions that they can take to help alleviate those problems; notifying the brokerage contact about continuing problems caused by the customs brokerage; and notifying buyer personnel who control the selection of the customs brokerages about continuing problems caused by the customs brokerage. Furthermore, since the buyer, the process owner and/or the customs brokerage might be part of the same company, variations in the message recipients might be appropriate in circumstances where particular job functions would suggest it.

It is to be understood that the invention comprises various apparatus, systems and methods for tracking and applying customs assistance information on customs documentation. Additionally, various embodiments of the invention can incorporate various combinations of the above-described features. In short, the above disclosed features can be combined in a variety of configurations within the anticipated scope of the invention.

Furthermore, embodiments of the invention can be incorporated into various systems and methods, and can incorporate elements of various customs systems and methods as described in U.S. patent application Ser. No. 09/971,878, which is incorporated herein by reference for all purposes.

While particular forms of the invention have been illustrated and described, it will be apparent that various modifications can be made without departing from the spirit and scope of the invention. For example, a customs information database can be customized to an individual buyer or an individual customs brokerage, potentially eliminating the tracking of certain information (e.g., the identity and/or country of the buyer), or potentially adding additional functionality (e.g., the automatic addition of a customs broker identification and payment information to the customs information. Thus, although the invention has been described in detail with reference only to the preferred embodiments, those having ordinary skill in the art will appreciate that various modifications can be made without departing from the scope of the invention. Accordingly, the invention is not intended to be limited by the above discussion, and is defined with reference to the following claims.

We claim:

1. A system for generating customs documents for the importation of goods purchased by a buyer from a seller, comprising a computer programmed with software, including:

a network interface:

a customs information system database having records configured to record transaction information identifying the purchased goods, a customs classification of the purchased goods, and a valuation of the purchased goods, wherein the customs information system database is configured to be in electronic communication with a customs broker via the network interface such that the customs broker can access records to generate customs documents reporting the transaction information; and an audit module configured to audit the transaction information, using an audit criterion, after the records are accessible by the customs broker for submission to a buyer's-country customs authority.

2. The system of claim 1, wherein the audit module is configured to audit records for which the customs information system database has provided the transaction information to the customs broker for final submission to a customs authority.

3. The system of claim 2, wherein the audit criterion tests customs classification information in the transaction information sent to the customs broker, against classification information in classification records.

* * * * *

UNITED STATES PATENT AND TRADEMARK OFFICE
CERTIFICATE OF CORRECTION

| | | |
|---|---|---|
| PATENT NO. | : 8,103,605 B2 | Page 1 of 1 |
| APPLICATION NO. | : 10/121268 | |
| DATED | : January 24, 2012 | |
| INVENTOR(S) | : Mei Li et al. | |

It is certified that error appears in the above-identified patent and that said Letters Patent is hereby corrected as shown below:

In column 11, line 13, in Claim 1, delete "interface:" and insert -- interface; --, therefor.

Signed and Sealed this
Sixteenth Day of October, 2012

David J. Kappos
*Director of the United States Patent and Trademark Office*